United States Patent [19]
Cottle et al.

[11] Patent Number: 6,008,750
[45] Date of Patent: Dec. 28, 1999

[54] MICROWAVE TRANSCEIVER UTILIZING A MICROSTRIP ANTENNA

[75] Inventors: Todd J. Cottle, Mt. Zion, Ill.; Yong-Hui Shu, Torrance, Calif.

[73] Assignee: Decatur Electronics, Inc., Decatur, Ill.

[21] Appl. No.: 08/798,866

[22] Filed: Feb. 11, 1997

[51] Int. Cl.⁶ .................................................. G01S 13/92
[52] U.S. Cl. .............................................. 342/42; 342/70
[58] Field of Search ................................ 342/42, 70, 104, 342/114

[56] References Cited

U.S. PATENT DOCUMENTS

| | | | |
|---|---|---|---|
| 4,318,103 | 3/1982 | Roettele et al. | 342/70 |
| 5,122,802 | 6/1992 | Marin | 342/13 |
| 5,508,706 | 4/1996 | Tsou et al. | 342/192 |
| 5,782,253 | 7/1998 | Cates et al. | 134/105 |

Primary Examiner—Ian J. Lobo
Attorney, Agent, or Firm—Knechtel, Demeur & Samlan

[57] ABSTRACT

A transceiver module for use in a police traffic surveillance radar system is provided which is of a smaller size and of a lighter weight than those traditionally available. The transceiver module includes a front, open-ended housing having a cavity, a transceiver assembly disposed within the cavity of the housing, and a radome fixedly secured over the opened end of the housing so as to enclose and hermetically seal the transceiver assembly within the cavity of the housing. The transceiver assembly is formed of an antenna card/plate subassembly, a diode housing subassembly, an oscillator/choke housing subassembly, and a printed circuit board subassembly all operatively interconnected together so as to form a fully integrated structure. As a result, the transceiver can overcome the space restrictions due to the requirement of passenger-side air bags.

10 Claims, 11 Drawing Sheets

MICROWAVE TRANSCEIVER UTILIZING A MICROSTRIP ANTENNA

BACKGROUND OF THE INVENTION

1. Field of the Invention

This invention relates generally to Doppler shifted radar systems for use in police traffic surveillance. More particularly, it relates to an improved transceiver design which is of a smaller size than those traditionally available and can be easily mounted on the rearview mirror of a patrol vehicle without impairing the operator's vision.

2. Description of the Prior Art

As is generally known, police traffic radar systems have been used heretofore in the prior art. The prior art traffic surveillance radar systems typically include a counting/display unit and a pair of antenna units (microwave transceivers) connected to the counting/display unit by serial data paths implemented through small flexible cables. The antenna units radiate microwave energy in the direction in which they are aimed. Frequently, the counter/display unit is mounted on top of the dashboard of the patrol vehicle. Also, it can be suspended from the radio rack underneath the dashboard by screws. One of the antenna units or microwave transceivers is generally mounted either to the front windshield, on top of the dashboard, or hooked adjacent the front fender of the patrol vehicle so as to point in the forward direction. The other antenna unit is generally mounted on the back of the patrol car such as on the rear windshield, headliner, or window trim.

Such conventional police radar systems in the current state of the art have been commercially available for many years and are typically exemplified by the police traffic radars manufactured and sold by Applied Concepts, Inc., located in Plano, Tex. Detailed descriptions and their operation have been described and illustrated in the following U.S. Pat. Nos.: 5,525,996; 5,563,603; 5,565,871; and 5,570,093 which are all assigned to Applied Concepts, Inc. and are incorporated herein by reference. There are also other known prior art traffic safety radars as evidenced by U.S. Pat. Nos. 5,504,488 and 5,528,246 which are both assigned to Kustom Signals, Inc. of Lenexa, Kans.

The problem with these prior art radar systems is that their design of the antenna unit or transceiver has used the combination of a microwave horn for collecting and concentrating the reflected microwave energy and a turnstile duplexer coupled to the horn via a circular antenna port. The turnstile functions to provide isolation between the transmitted and the received microwave energies in order to permit the transmitter and receiver circuitry to share the same antenna. While the microwave horn performs efficiently and cost effectively as a transmitting/receiving antenna, it suffers from the disadvantage of requiring a relatively large amount of space.

Even though the manufacturers have introduced the use of a dielectric lens at the aperture of the horn so as to reduce its length and still maintain maximum gain, there is created the problem that as the length of the horn is shortened the flair angle is increased. It has been found that the flair angle cannot be made much greater than 60° in order to obtain a sufficient performance. Further, it has been empirically determined that an antenna with a 12° beamwidth provides the optimal performance for police radars. Since the aperture diameter of the horn and the beamwidth of the antenna are related mathematically, this renders the Ka-band antenna having a 12° beamwidth to have an aperture of a diameter slightly larger than 2 inches. Thus, this causes the length of the horn to be approximately 1¾ inches long. Further, due to the depth of the turnstile and its enclosure the overall length of the transceiver is increased. Typically, practical transceivers in common use are on the order of 3 inches in length which causes the transceiver to be quite large in size.

This large-size transceiver problem is further complicated by the fact that as of August, 1993, all passenger cars manufactured and sold in the U.S. must contain passive restraint systems (e.g., automatic seat belts and air bags) for both occupants of the front seat—driver and passenger, as mandated by the Federal Motor Vehicle Safety Standard #208. The requirement of air bags, especially air bags on the passenger side, have placed severe limitations on the location where the Doppler radar transceivers have been historically mounted in police vehicles. This is because the deployment of the passenger side air bag will require a considerable amount of space, thereby leaving very little room for placement of police equipment such as radar, video camera, shotgun and the like.

Since the air bags are inflated with an explosive force and will interact with any object in the deployment zone, automotive vehicle manufacturers have generally recommended that this deployment zone be kept free of any equipment in order to reduce the risk of injury to the vehicle occupant or the vehicle itself. At present, the air bag on the passenger side cannot be legally disabled, but this law may be altered in the future. The problem of location of the radar system caused by the necessity of air bags is further exacerbated by the constraint that the transceiver of the radar system must be positioned so that the operator's vision is not impaired. Moreover, since the head of the transceiver is susceptible to random noise interference from various other equipment contained in the control vehicle such as the vehicle's defroster fan, this further restricts the area that can be used to position the transceiver.

While radar manufacturers have heretofore addressed the large-size problem of radar systems by reducing the signal processing circuitry inside of the counter unit and the electrical components used in the display unit, the inventors are unaware of any developments which allow for a substantial reduction in the size of the "classical" transceiver design. However, there have been attempts made in the prior art to design the microwave transceiver to operate from X or K-band frequencies to a Ka-band frequency since the transmitting of higher frequencies will decrease proportionally the size of the transceiver. The improved transceiver construction of the present invention has a volumetric reduction on the order of 50% when compared with the conventional transceivers of the prior art. Further, the transceiver of the present invention is a fully integrated structure which can be manufactured economically and can be easily mounted behind the rearview mirror of a patrol vehicle (which is an air bag safety zone) without hindering use of the rearview mirror.

SUMMARY OF THE INVENTION

Accordingly, it is a general object of the present invention to provide an improved transceiver having a unique structural design and size reduction which overcomes the problems that have been encountered by the conventional transceivers.

It is an object of the present invention to provide an improved transceiver design which is of a smaller size on the order of a 50% reduction over those transceivers traditionally available.

It is another object of the present invention to provide an improved transceiver which is a fully integrated structure which can be manufactured economically and which is relatively easy to assemble.

It is another object of the present invention to provide an improved transceiver which can be easily mounted behind the rearview mirror of a patrol vehicle without hindering use of the rearview mirror or impair the operator's vision.

It is still another object of the present invention to provide a transceiver module formed of a housing, a transceiver assembly, and a radome all operatively interconnected together so as to form a fully integrated structure.

In a preferred embodiment of the present invention, there is provided a transceiver module for use in a police traffic surveillance radar system which is formed of a small, compact construction and is lightweight. The transceiver module includes a front, open-ended housing having a cavity, a transceiver assembly disposed within the cavity of the housing, and a radome fixedly secured over the opened end of the housing so as to enclose and hermetically seal the transceiver assembly within the cavity of the housing. The transceiver assembly includes an antenna card/plate subassembly, a diode housing subassembly, an oscillator/choke housing subassembly, and a printed circuit board subassembly all interconnected together.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
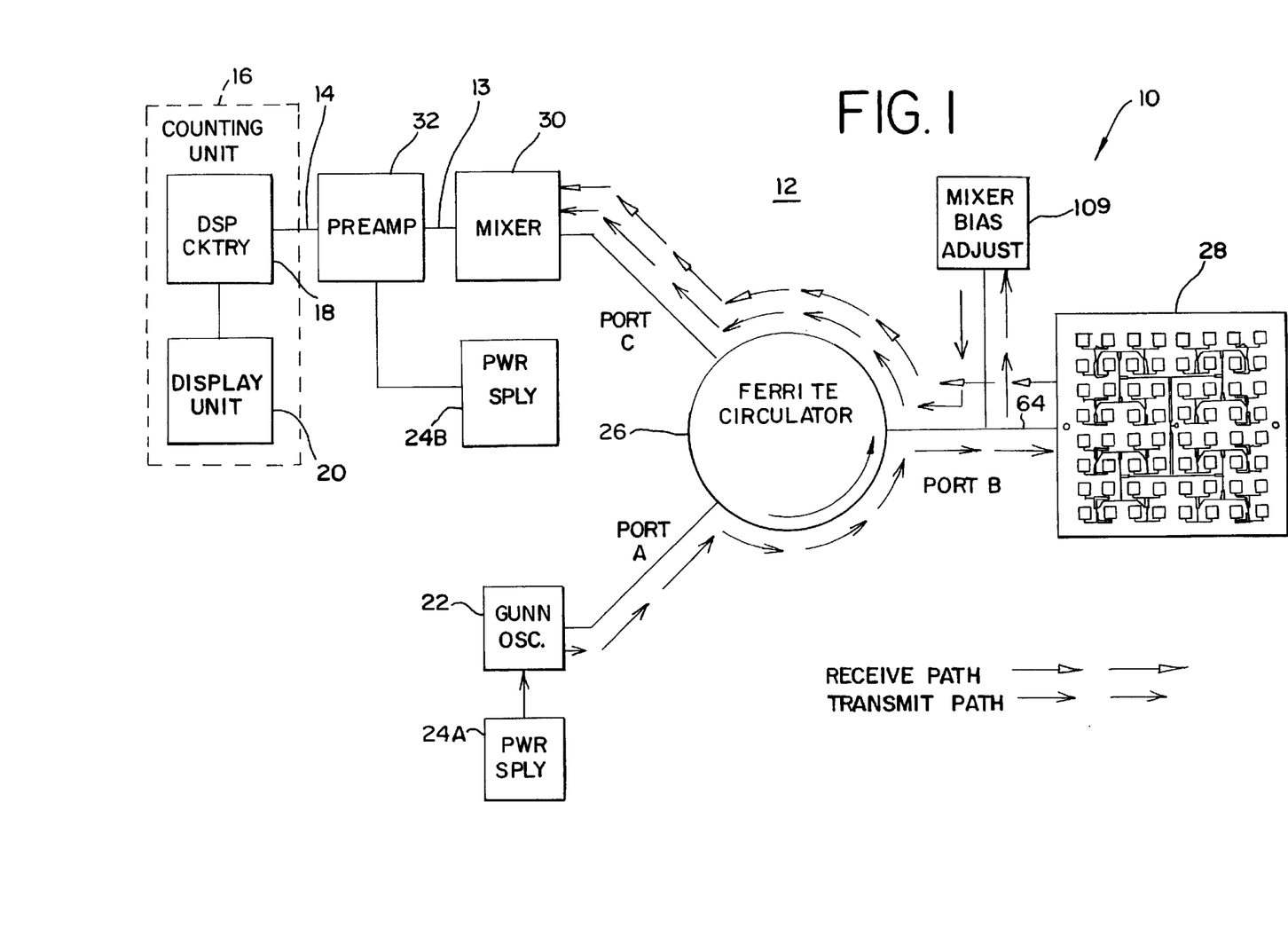
FIG. 1 is an overall functional block diagram of a Doppler-shifted traffic radar system having an improved transceiver, constructed in accordance with the principles of the present invention.

Referring now in detail to the various views of the drawings, there is shown in FIG. 1 an overall functional block diagram of a Doppler-shifted traffic radar system 10 having an improved transceiver 12, constructed in accordance with the principles of the present invention. The transceiver 12 is coupled via a multi-conductor cable enclosed by a braided shield, represented by a line 14, capable of carrying formatted data to a counting unit 16. The counting unit 16 is formed of a digital signal processing (DSP) circuitry 18 and a display unit 20. The DSP circuitry 18 is used to provide digital data communication between the counting unit 16 and the transceiver 12 and to drive the display unit 20 for displaying a combination of target and/or patrol vehicle speeds to the operator.

Typically, the counting unit 16 is controlled by the operator (trooper) by pushing buttons located on a remote control unit (not shown). The remote control unit may be either a conventional infrared control similar to those used in operating a TV set or one that is physically coupled to the counting unit by a communication cable. It should be clearly understood that it is within the teachings of the present invention to use any type of conventional design for the counting unit and remote control since they do not form a part of the present invention.

The improvement of the instant invention resides in the new and novel structural design of the transceiver 12 in the traffic radar system 10 of FIG. 1. The transceiver 12 is fabricated in a fully integrated package which has significant reduction in its volumetric size on the order of 50% when contrasted with the conventional "classic" designs that are commercially available. In view of its smaller overall size, the improved transceiver may be easily mounted and preferably behind the rearview mirror of a patrol vehicle (which is an air bag safety zone) so as to not adversely affect the use thereof. Further, this preferred location of the transceiver will not impair the vision of the operator and will be located a relatively large distance away from other vehicle equipment, such as a defroster fan, that may cause noise interference problems. Moreover, the improved transceiver is economical in cost and is relatively easy to manufacture and assemble. As a result, the transceiver 12 of the present invention represents a significant advance in the state of the art in current radar systems in terms of size, weight, performance (noise immunity) and cost.

As can be seen from FIG. 1, this diagram illustrates a functional representation of the improved transceiver 12 of the radar system 10. The general overall components of the transceiver 12 and its operation will now be described in detail. A Gunn diode oscillator 22 is provided for converting DC energy into microwave signals at a frequency of 35.5 GHz±100 MHz. A power supply 24A includes an adjustable voltage regulator for supplying a regulated +5.8 VDC to the Gunn diode oscillator 22. When activated, the Gunn oscillator generates microwave energy which is sent through a small iris, down a short section of waveguide and into a port A of a 3-port Ferrite circulator 26. The RF properties of the Ferrite circulator routes the RF energy to a port B which is coupled to a microstrip patch antenna 28 via a small screw and coaxial probe. The Ferrite circulator serves substantially the same purpose and replaces the turnstile duplexer in a conventional transceiver. In other words, the Ferrite circulator permits simultaneous transmission and reception of signals while isolating the transmitter from reflections due to the antenna mismatch.

The microstrip patch antenna 28 radiates the radio frequency energy and converts the same to circularly polarized energy with right turn circular waves. A controlled amount of this energy from the oscillator 28 is reflected back to the port B by a mixer bias adjust 109 to the circulator 26 and is routed to port C for supplying L.O. drive to the mixer 30 connected thereto. However, most of the energy enters the coaxial probe 64 and is eventually radiated.

When the transmitted microwave signal strikes a moving target, reflected microwave energy from the target encountered will have its frequency changed by the relative motion between the transmitting antenna and the target in accordance with the well-known Doppler shift phenomenon. The reflected microwave energy has also been changed from right hand circular polarization to left hand circular polarization. It is generally known that in a 35.5 GHz Ka-band transceiver the Doppler shift is approximately 105.901 Hz/MPH. In order to determine the relative speeds between the moving transmitting antenna (e.g., in the patrol car) and the target (i.e., speeding car), both the Doppler shifted energy (reflected microwave energy) and a sample of the unshifted energy (original transmitted energy) are collected and sent to the mixer 30. The Doppler shifted energy is collected by the antenna 28 and is sent back to the port B of the circulator 26 via the coaxial probe 64. A sample of the unshifted energy is reflected off the mixer bias adjust 109 and is sent back to the port B of the circulator 26. Energy that enters the port B of the circulator 26 is routed to the port C which connects to the mixer 30.

The mixer 30 which mixes the L.O. or transmitted energy and the reflected energy together so as to produce sum and difference signals between the transmitted frequency and the frequency of the reflected microwave energy. These frequencies are passed through a mixer bias choke 110 which functions as a low pass filter so as to remove any residual microwave energy. The mixer bias choke 110 extracts the Doppler shifted energy and then routes it to an audio range preamplifier circuitry 32 to be processed for detecting speed measurements of the patrol car and the moving target.

Figures 2, 3:
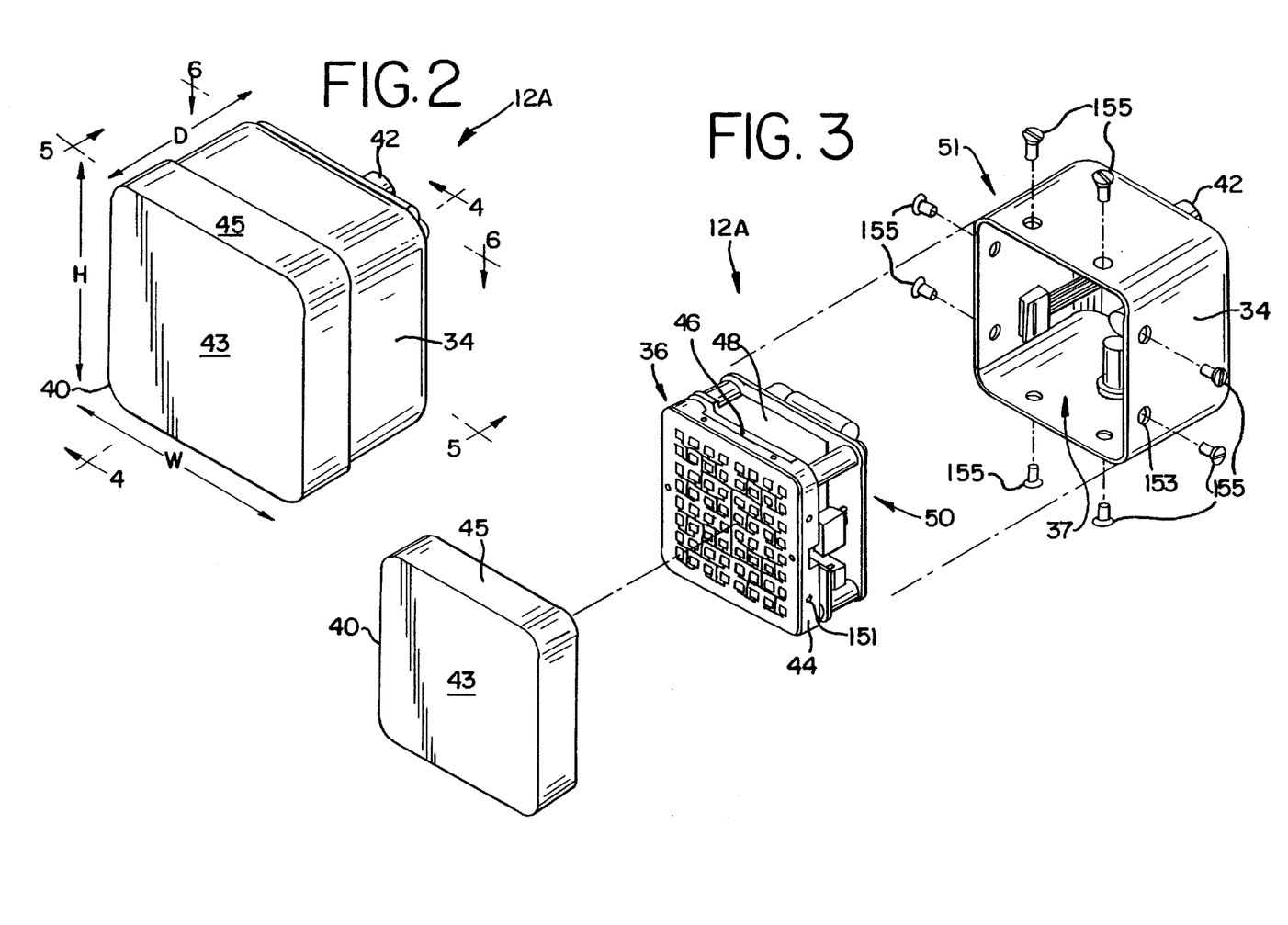
FIG. 2 is a perspective view of the transceiver according to the present invention.
FIG. 3 is an exploded perspective view of the transceiver of FIG. 2.

In FIG. 2, there is shown a perspective view of a fully assembled transceiver structure used in the radar system 10 of FIG. 1. The Ka-band (35.5 GHz) transceiver module 12A is of a substantially cubical construction having a width dimension W of approximately 2.3 inches, a height dimension H of approximately 2.3 inches, and a depth dimension D of approximately 1.7 inches. The transceiver module 12A is of a compact size which is less than half the size of a conventional Ka-band transceiver and is lightweight, weighing less than 0.45 lbs. Consequently, the improved transceiver module 12A can accomplish the demanding space restrictions due to the requirement of passenger-side air bags. The transceiver module 12A can be preferably mounted on the rearview mirror of a patrol vehicle without impairing the vision of the operator.

As can best be seen from FIG. 3, the module is comprised of a front, open-ended housing or casing 34 having a rectangularly-shaped cross-section, a transceiver assembly 36 received within a cavity 37 of the housing, a radome 40 covering the front end of the housing, a circular type connector 42 mounted on the outer back surface of the housing. The housing 34 is fabricated preferably from a metallic material such as aluminum which can be anodized or painted black on its outer surface. The radome 40 includes a flat, rectangularly-shaped front face 43 and a rectangular flange portion 45 extending rearwardly therefrom. The radome is preferably made of a suitable plastic material such as black Lexan. The radome is attached over the open end of the housing 34 so as to enclose and hermetically seal the transceiver assembly 36 within the cavity 37 of the housing.

Figure 4:
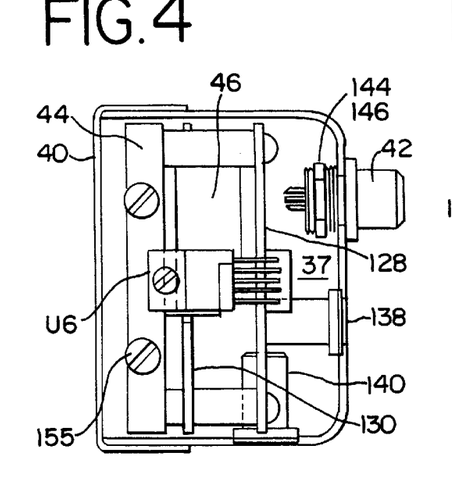
FIG. 4 is a cross-sectional view, taken along the lines 4—4 of FIG. 2.
Figure 5:
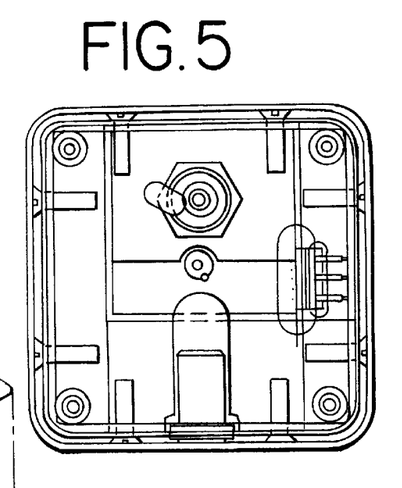
FIG. 5 is a cross-sectional view, taken along the lines 5—5 of FIG. 2.
Figure 6:
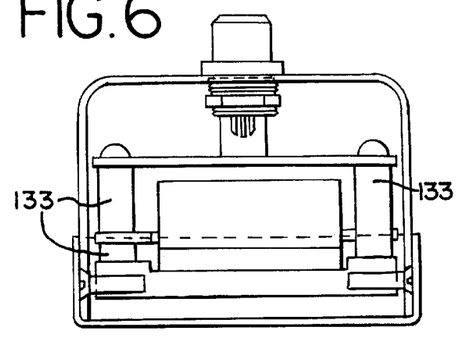
FIG. 6 is a cross-sectional view, taken along the lines 6—6 of FIG. 2.

The Ka-band (35.5 GHz) transceiver assembly 36 is comprised of an antenna card/plate subassembly 44, a diode housing subassembly 46, an oscillator/choke housing subassembly 48, and a printed circuit board subassembly 50 which are all assembled together and further assembled to the housing assembly 51 and to the radome 40 so as to form the fully assembled transceiver module 12A of FIG. 2. In FIGS. 4 through 6, there are illustrated cross-sectional views of the fully assembled transceiver module of FIG. 2 so as to better show their interconnection. The structural details of the various subassemblies 44–50 and the manner in which the components are mounted and how they are interconnected together will now be explained more fully with reference to FIGS. 7 through 12.

Figure 7A:
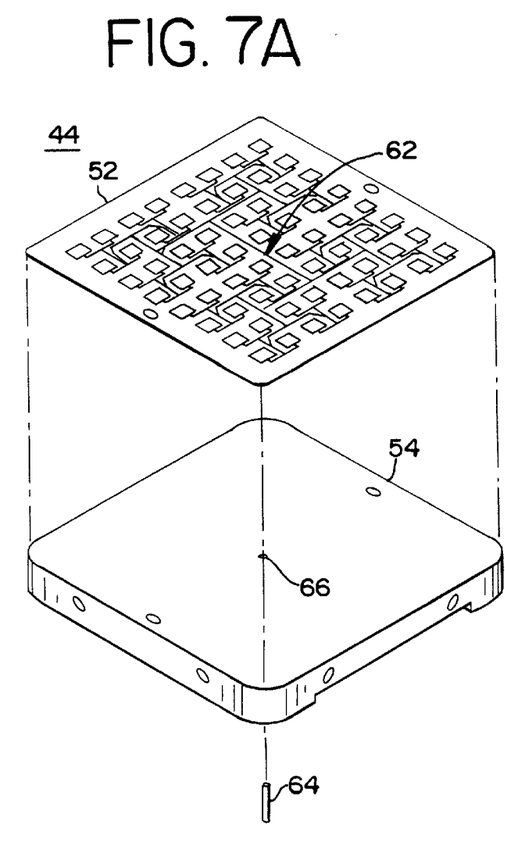
FIGS. 7a–7c are detailed views of the antenna card/plate sub-assembly.
Figure 7B:
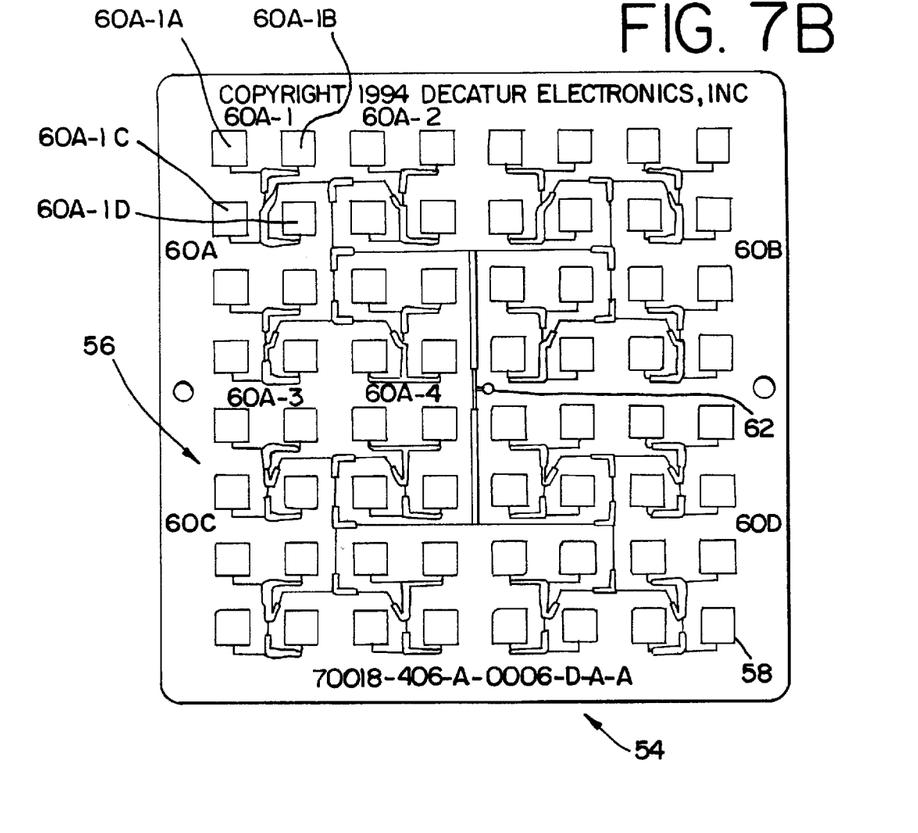
Figure 7C:
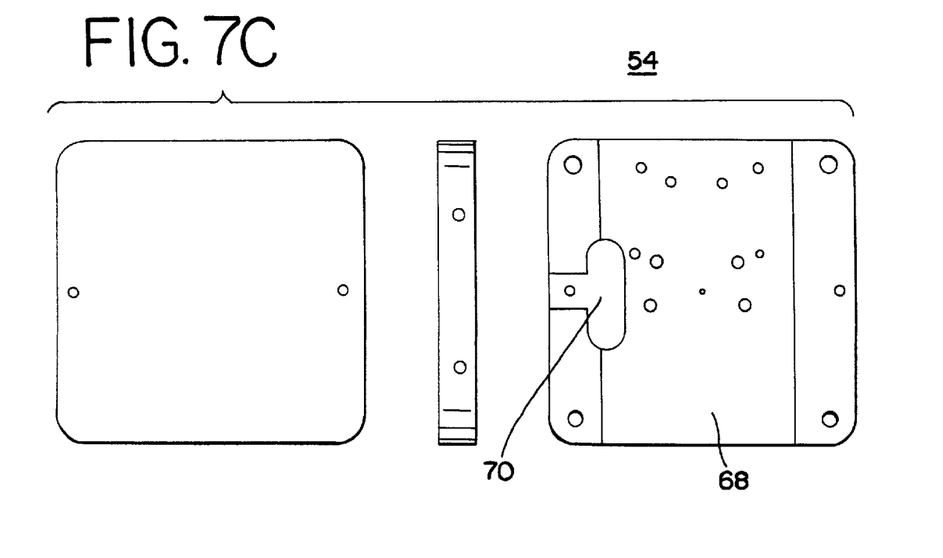

An exploded, perspective view of the antenna subassembly 44 is shown generally in FIG. 7a. The antenna subassembly 44 is formed of an antenna card 52, an antenna plate 54 whose details are illustrated in FIGS. 7b and 7c, respectively, and a coaxial probe 64. In FIG. 7b, the top surface 53 of the antenna card 52 has disposed thereon a patch antenna array 56 consisting of a plurality of square, side-fed patches 58 with quarterwave microstrip matching elements utilizing the same photo-etching technology which is conventional for producing other microwave integrated circuits. The plurality of patches 58 are arranged in a matrix pattern which are connected via a "corporate feed" network. The corporate feed network receives microwave energy from the coaxial probe 64 and routes the energy with the proper phase and amplitude to each individual patch element such as patch element 60a-1a. The patch elements operate in unison order to create the desired antenna radiation pattern.

As can be seen, there are sixty-four patch elements or patches which can be divided into four symmetrical quadrants 60a–60d, each consisting of sixteen patches. Each of the quadrants 60a–60d are further divided into four symmetrical sub-quadrants. For example, the first quadrant 60a includes four sub-quadrants 60a-1 through 60a-4, each sub-quadrant being formed of four patches. Finally, the four patches in each of the sub-quadrants of each quadrant is arranged in four more sub/sub-quadrants. For example, the sub-quadrant 60a-1 is formed of four patches 60a-1a through 60a-1d.

In the center of the antenna plate 54, there is provided a hole 62 for receiving a pre-formed coaxial probe 64 which is insertable from the top surface 53 thereof and through the aligned opening 66 in the antenna plate so as to extend outwardly therefrom. The antenna card 52 is fixedly secured to the antenna plate 54 in any suitable manner. FIG. 7c is a rear plan view of the antenna plate 54 which includes a channel 68 formed in its intermediate area for receiving the diode housing subassembly 46 and an elliptically-shaped slot 70 joined to one side of the channel.

Figure 8A:
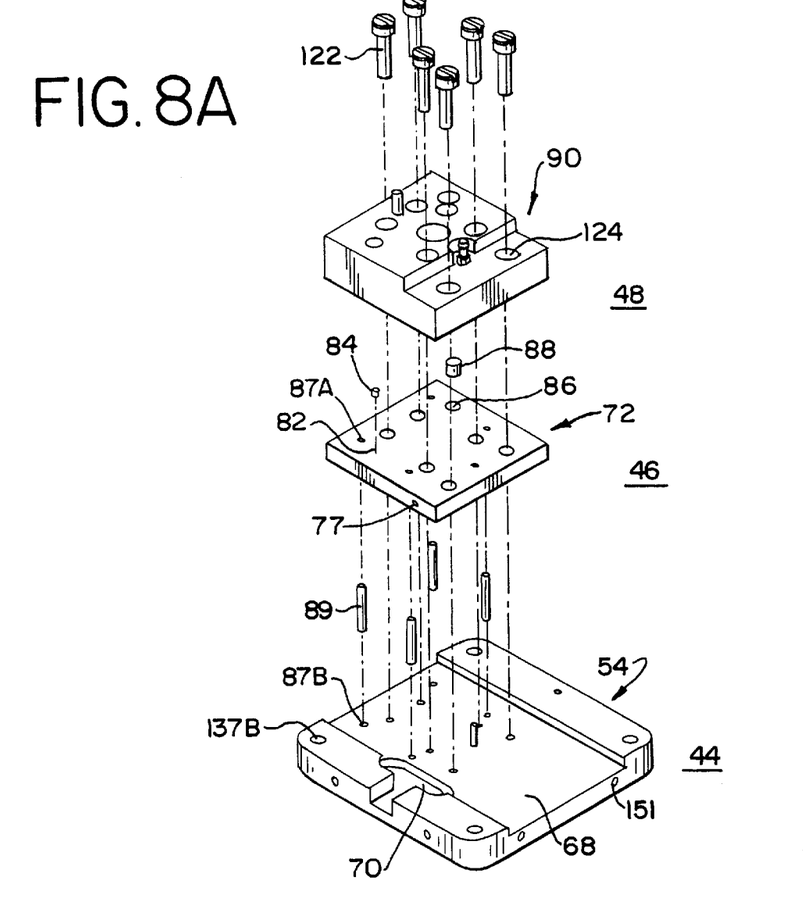
FIGS. 8a–8c are detailed views of the diode housing sub-assembly.
Figure 8B:
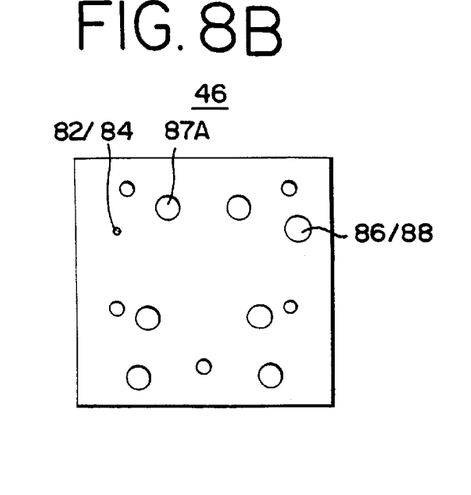
Figure 8C:
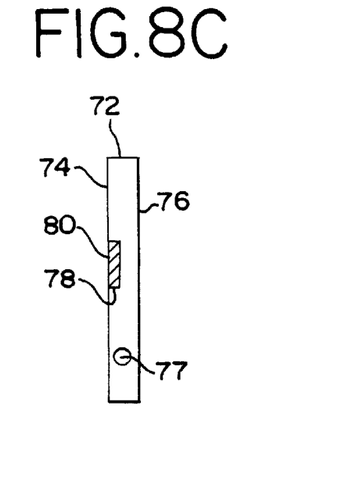

The diode housing subassembly 46 is depicted generally in FIG. 8a and in more detail in FIGS. 8b and 8c. FIG. 8b is a rear plan view of the diode subassembly 46, and FIG. 8c is a side view thereof. The diode subassembly 46 includes a rectangularly-shaped baseplate 72 having a front surface 74 and a back surface 76. In the central portion of the front surface 74, there is provided an annular recess 78 for receiving a magnet 80 therein. On the back surface 76 of the base-plate 72, there are provided a first aperture 82 for receiving a mixer diode 84 and a second aperture 86 for receiving therein a Gunn diode 88. The diode housing subassembly 46 is joined to the antenna subassembly 44 via four dowel pins 89 (FIG. 8a) whose respective ends are inserted into aligned holes 87a, 87b formed in the antenna plate 54 and the baseplate 72 so as to form an antenna/diode subassembly.

Figures 9A, 9B:
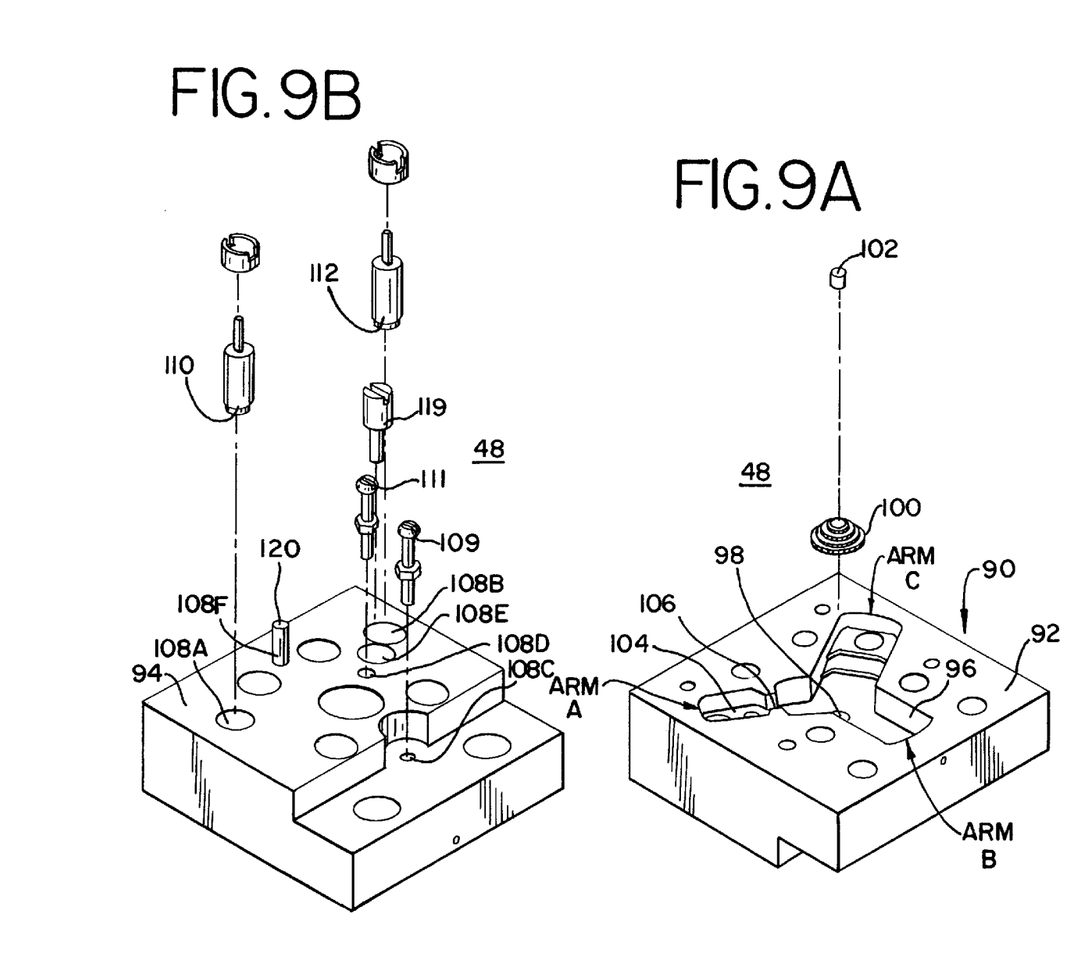
FIGS. 9a–9b are detailed views of the oscillator/choke housing sub-assembly.

The oscillator/choke housing subassembly 48 is also shown generally in FIG. 8a and in more detail in FIGS. 9a and 9b. FIG. 9a is a front perspective view of the oscillator/ choke housing subassembly 48, and FIG. 9b is a rear perspective view thereof. The oscillator/choke housing subassembly is formed of an oscillator block 90 having a front side 92 and a rear side 94. On the front side 92 there is provided a Y-shaped circulator cavity 96 in which there are formed arms A, B and C corresponding to ports A, B and C of the circulator 26 if FIG. 1. In the central portion of the cavity 96, there is provided a circular recess 98 for mounting a circulator pedestal 100. A Ferrite puck 102 is fixedly secured to the center of the pedestal 100 by any suitable means such as gluing. The arm A defines an oscillator cavity 104 for communication with the Gunn diode 88, a Gunn choke 112, a Gunn power adjustment screw 111, and a tuning rotor 119. The cavity 104 communicates via a small iris 106 with the arm A of the circulator cavity 96. The arm B communicates with the antenna feedthrough, and the arm C communicates with the mixer diode 84 and a mixer choke.

As can best be seen from FIG. 9b, the rear side 94 of the oscillator block 90 includes a plurality of recesses 108a through 108f. The recesses 108a and 108b accommodate the mixer choke subassembly 110 and the Gunn choke subassembly 112, respectively. The construction of the mixer choke subassembly 110 is shown in more detail in FIG. 10 and will be described more fully later. A tuning screw element defining the mixer bias adjust 109 (FIG. 1) is disposed in the recess 108c. The mixer bias adjust 109 is used to provide a mismatch with the antenna feedthrough 64 in the arm B at the circulator cavity 96 in order to create drive for the L.O. A tuning screw defining a Gunn power adjust 111 is disposed in the recess 108d. The Gunn power adjust 111 is in communication with the oscillator cavity 104 for controlling the transmitted power by varying the electrical characteristics of the iris 106.

The tuning rotor 119 is disposed in the recess 108e and is in communication with the oscillator cavity for controlling the transmitter frequency by varying the geometry of the cavity. The tuning rotor 119 is preferably formed with a ceramic portion so as to maintain stability of the transmitted frequency to be ±100 MHz in the temperature range of −30° to +85° C. The recess 108f receives a ground lug 120 to provide a ground connection to the printed circuit board subassembly 50. The oscillator/choke subassembly 48 is assembled to the diode housing subassembly 46 via the dowel pins 89. Six threaded screws 122 are inserted in opening 124 formed in the oscillator/choke subassembly 48 and are screwed into mated threaded openings 126 in the diode housing subassembly 46.

Figure 10:
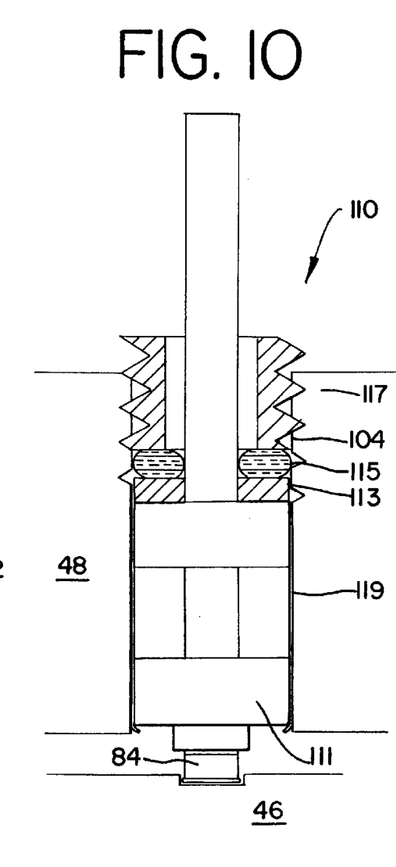
FIG. 10 is a detailed view of the choke sub-assembly.

In FIG. 10, there is illustrated the detail construction of the mixer choke subassembly 110. Since the construction of the Gunn choke subassembly 112 is identical to the mixer choke subassembly 110, it will be sufficient to describe only the mixer choke subassembly. However, it should be noted that the physical size of the Gunn choke subassembly 112 may be different. The mixer choke subassembly 110 includes a mixer bias choke 111, a Ferrite load 113 disposed on the choke, an O-ring 115 placed on top of the Ferrite load, and a lock screw 117 for holding the pieces together. Also, a tape 119 is wrapped around the bias choke 111 and the Ferrite load 113 so as to prevent contact with the wall of the oscillator cavity 104.

Figures 11, 12:
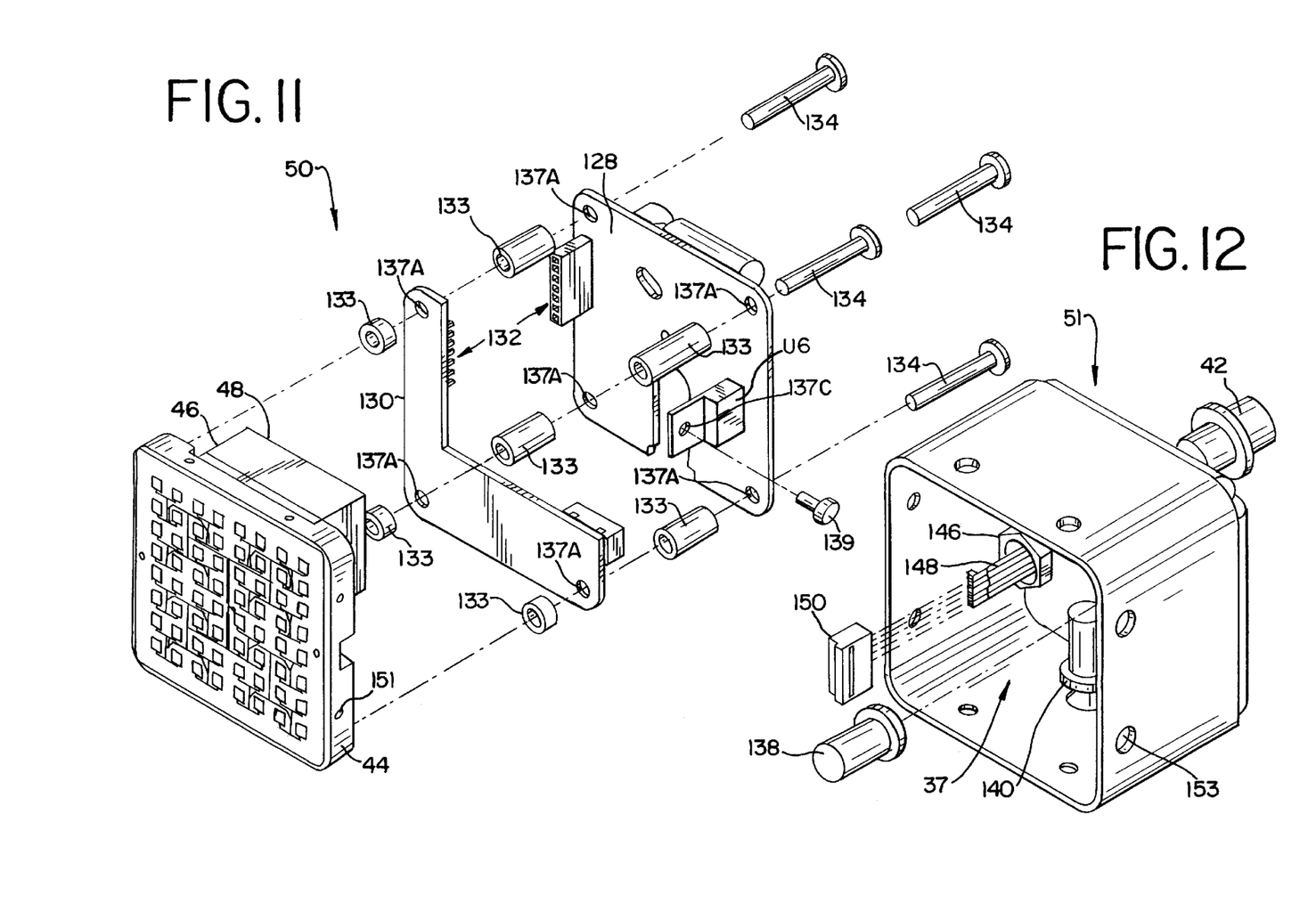
FIG. 11 is a detailed view of the printed circuit board sub-assembly.
FIG. 12 is a detailed view of the housing sub-assembly.
Figure 13:
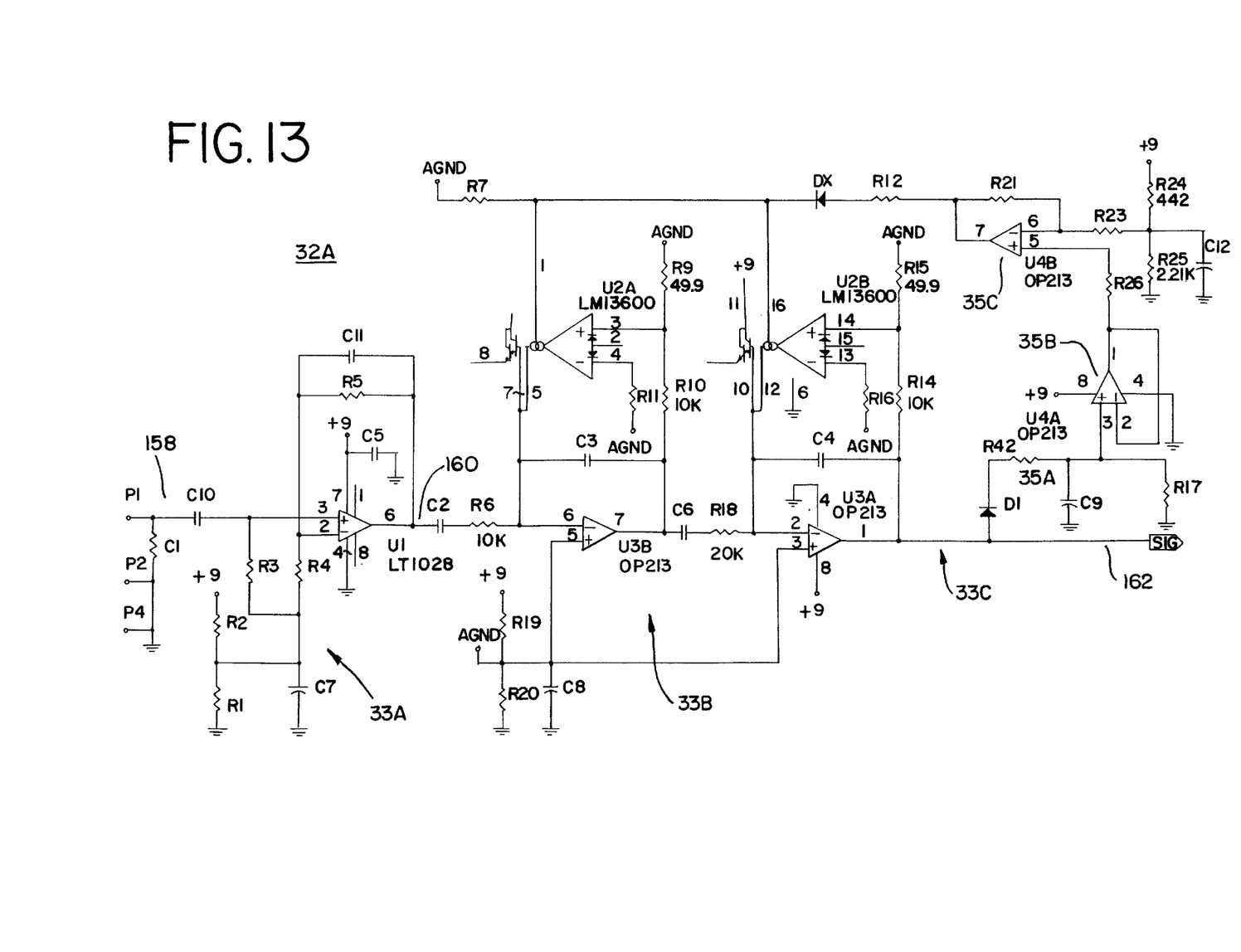
FIG. 13 is a schematic circuit diagram of the preamplifier section of the preamplifier circuitry.
Figure 14:
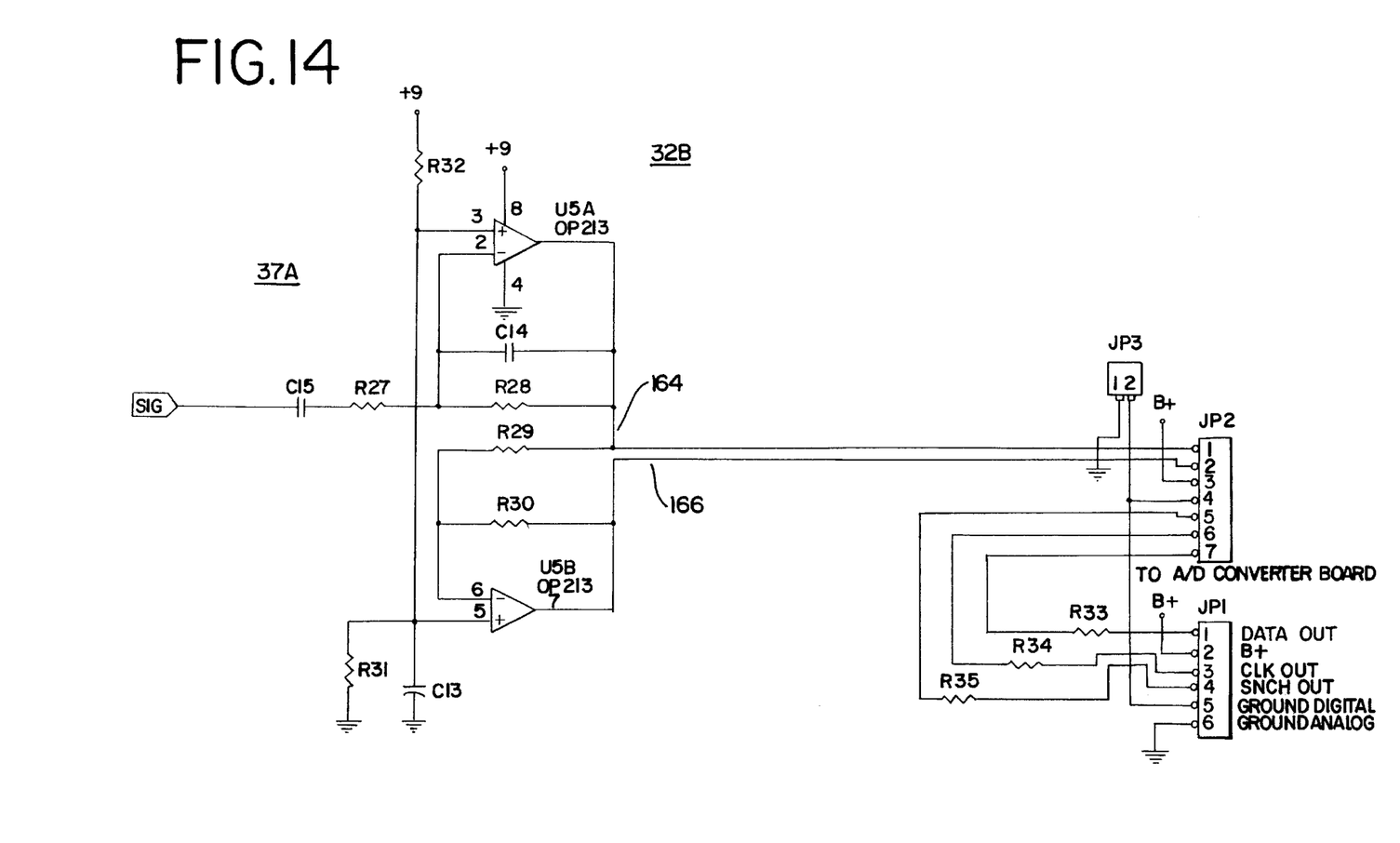
FIG. 14 is a schematic circuit diagram of the conditioning circuit of the A/D conversion section.
Figure 15:
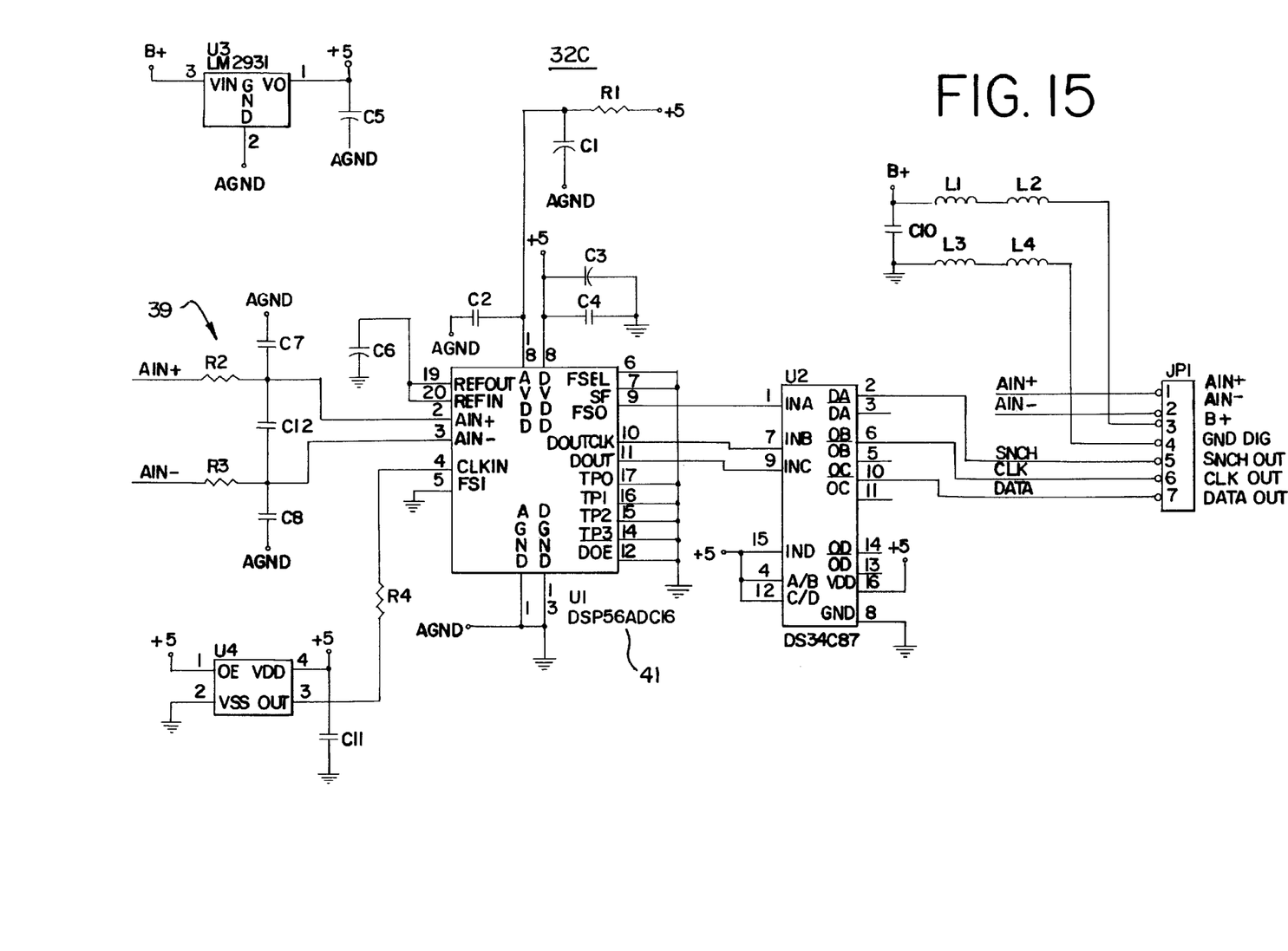
FIG. 15 is a schematic circuit diagram of the A/D converter circuit of the A/D conversion section.
Figure 16:
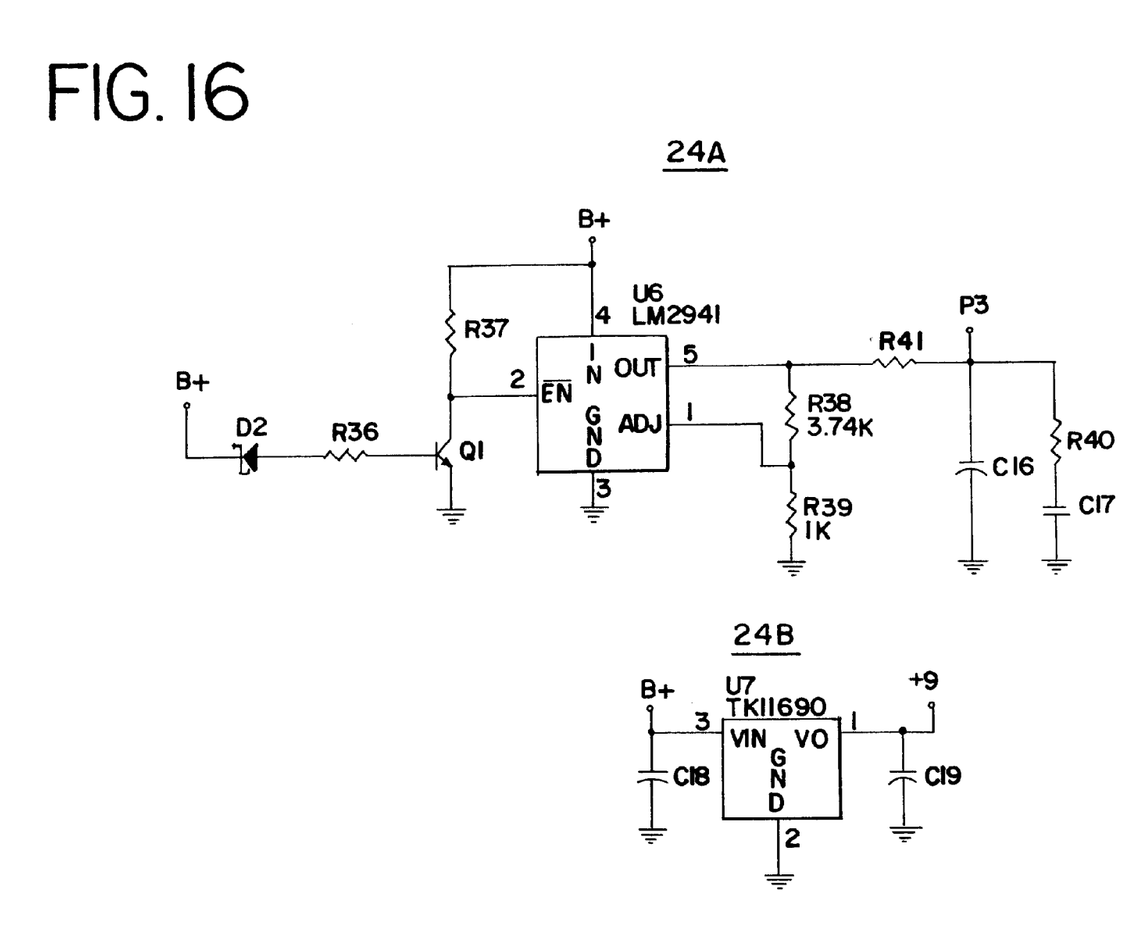
FIG. 16 is a schematic circuit diagram of the power supply circuitry.

The printed circuit board subassembly 50 is shown generally in FIG. 3 and in more detail in FIG. 11. The printed circuit board subassembly 50 includes a bottom board 128 and a top board 130 which are joined together via combination plug/jack connector 132. The bottom board 128 is a conventional printed circuit board and is used to mount the electrical circuit components of the preamplifier section 32A and the conditioning circuit 32B of the preamplifier circuitry 32 (FIG. 1) as well as the power supply circuitry 24A, 24B. The top board 130 is also a conventional printed circuit and is used to mount the A/D converter 39 and associated components of the A/D conversion section 32C. A schematic circuit diagram of the preamp section 32A is shown in FIG. 13. A schematic circuit diagram of the conditioning circuit 32B is illustrated in FIG. 14. In FIG. 15, there is depicted a schematic circuit diagram of the A/D conversion section 32C. In FIG. 16, there is shown a schematic circuit diagram of the power supply circuitry 24A and 24B. The power supply 24A includes a I.C. voltage regulator U6 (LM2941) which is mounted on the bottom board 128 and extends through the opening in the top board 130.

With the top and bottom boards connected together, the printed circuit board subassembly 50 is secured to the antenna subassembly 44, diode housing subassembly 46, and the oscillator/choke housing subassembly 48 by aligning the holes 137a on the printed circuit board subassembly with the holes 137b on the antenna subassembly (FIG. 8A) as well as aligning the opening 137c on the voltage regulator U6 with the threaded holes 77 in the side of the baseplate 72 so that the regulator extends into the elliptical slot 70 of the antenna subassembly 44. Then, a plurality of stand-offs 133 are inserted and aligned with the openings 137a in the printed circuit board subassembly 50. Next, four screws 134 are inserted through the holes 137a in the printed circuit board subassembly and the stand-offs 133 and are threaded into the openings 137b in the antenna sub-assembly. Also, a screw 139 is inserted through the hole 137c in the voltage regulator U6 and is threaded into the hole 77 in the baseplate 72. In this manner, the transceiver assembly 36 of FIG. 3 is formed.

The housing assembly 51 is shown generally in FIG. 3 and in more detail in FIG. 12 of the drawings. Two self-clinching inserts 138, 140 are installed on the back and bottom of the housing 34 (FIG. 4). The circular connector 42 is placed on the back side of the housing 34 and is held securely by a washer (not shown) and a lock nut 146. A ground wire (not shown) on the connector 42 is soldered to the bottom board 128 of the printed circuit board subassembly 50. Also, a harness connector 150 having a wire bundle 148 from the housing assembly is connected to a connector (not shown) on the bottom board 128. The transceiver assembly 36 is then inserted into the cavity 37 of the housing assembly so that the holes 151 on the side of the antenna subassembly 44 is aligned with the holes 153 on the side of the housing assembly. A plurality of screws 155 (FIG. 3) are used to fasten the housing assembly 51 to the transceiver subassembly 36. Finally, the radome 40 is placed around the housing assembly and against the front face of the antenna card 52 so as to form the fully assembled transceiver module 12A of FIG. 2.

The preamplifier circuitry 32 (FIG. 1) is coupled to the output of the mixer 30 via a line 13 and is formed of the preamplifier section 32A, the conditioning circuitry 32B, and an A/D conversion section 32C. Referring now back to FIG. 13, the preamplifier section 32A of the preamplifier circuitry 32 (FIG. 1) is comprised of a first stage amplifier 33a, an automatic gain control (AGC) circuit 33b, and a current control circuit 33c. The first stage amplifier 33a includes a conventional low noise, low distortion op amp U1 and associated resistors R3, R4, R5 and capacitor C11 which are connected so as to form an non-inverting op amp configuration. The op amp U1 is an I.C. LT1028 which is commercially available from Linear Technologies. The op amp U1 has a gain of 40 dB which is set by the resistors R4 and R5. The output signal from the mixer 32 is applied via line 158 (terminal P1) to the first stage amplifier 33a. The resistor R3 provides a video load impedance for the mixer 32. The resistors R1, R2 and capacitor C7 serve to provide a +4.5 volts analog ground reference for the op amp U1. The capacitor C10 is used to block any DC signal components coming from the mixer 32 from entering the op amp U1. The capacitor C11 is used in combination with the resistor R5 to define a high frequency cut-off (100 KHz) for noise filtering. The capacitor C5 provides a power supply bypass so as to shunt any RF energy on the power lines to ground, and the resistor C1 interacts with the mixer bias adjust 109 to set the operating point of the mixer diode 84. The output of the op amp U1 on pin 6 is coupled via capacitor C2 and resistor R6 to the input of the AGC circuit 33b.

The AGC circuit 33b functions to compress the high level Doppler signals on line 160 from the first stage amplifier 33a so as to prevent clipping of the same. The AGC circuit 33b includes a dual low noise amplifier U3A, U3B, and a dual transconductance I.C. amplifier U2A, U2B. The amplifier U3A, U3B is an I.C. OP 213 which is commercially available from Analog Devices. The transconductance amplifier U2A, U2B is an I.C. LM13600 from National Semiconductor. The amplifiers U2A, U3B form a first compression stage functioning as a currentcontrolled voltage whose gain is controlled by the amount of current supplied to pin 1 of amplifier U2A. The amplifiers U2B, U3A form a second compression stage functioning as a current-controlled voltage whose gain is controlled by the amount of current supplied to pin 16 of amplifier U2B. The gain of each stage is inversely proportional to the amount of current supplied thereto.

The maximum attenuation (smallest gain) of the first stage is established by resistors R6, R9 and R10. With the values shown in the schematic diagram, there will be an attenuation of approximately –6 dB. The resistors R9, R10 function as a voltage divider so as to reduce the voltage applied to the non-inverting input (pin 3) of the amplifier U2A and thus reduces its distortion. The resistor R11 serves to provide bias current to the inverting input (pin 4) of the amplifier U2A. Similarly, the maximum attenuation of the second stage is determined by the resistors R18, R14, R15 and will provide an attenuation of –12 dB for the given values. The resistor R15 provides for reduced distortion, and the resistor R16 provides bias current to the pin 13 of the amplifier U2B. Resistors R19, R20 and capacitor C8 serve to provide a +4.5 volts analog ground reference for the amplifiers U3A, U3B. The capacitors C2 and C6 are used to block any DC signals from entering the amplifiers U3B and U3A, respectively.

The current control circuit 33c is used to control the amount of current supplied to the transconductance amplifiers U2A, U2B so as to determine the overall gain of the AGC circuit 33b. When the transconductance amplifier is being operated at full gain (i.e., the amplitude level of the amplified audio or Doppler signal is very low), the amount of control current is established by the resistor R7 through the analog ground node AGND. As the Doppler signal increases, a threshold point will be reached where the control current will begin to increase and cause the output signal of the AGC circuit 33b to a level amplitude. The control current circuit 33c is comprised of a peak detector circuit 35a, a buffer amplifier 35b, and a difference amplifier 35c.

The peak detector circuit 35a includes a diode D1, resistors R17 and R42, and a capacitor C9. The resistor R42 is used to set the attack time for the AGC circuit 33b, and the resistor R17 controls its release time. The buffer amplifier 35b is an I.C. U4A (OP213) connected as a unity gain amplifier having its input (pin 3) connected to the output of the peak detector circuit 35a and its output (pin 1) connected to the input of the difference amplifier 35c. The difference amplifier 35c is formed of an I.C. U4B (OP213) whose non-inverting input is coupled via resistor R26 to the output of the buffer amplifier U4A and whose inverting input is coupled to a reference voltage (+7.2 volts) generated by a voltage divider (R24, R25, C12). The difference amplifier U4B subtracts the reference voltage from the buffered peak detected voltage and amplifies the same. This amplified voltage is fed to the anode of the diode DX via resistor R12 which effectively converts the voltage into a current for driving pin 1 of the amplifier U2A and pin 16 of the amplifier U2B.

In operation, when the Doppler signal is of a low amplitude (distant target) the output (pin 7) from the difference amplifier U4B will be less than the diode threshold voltage of +0.7 volts. Thus, the diode DX will be off and the current will be controlled entirely by the resistor R7, as previously pointed out. As the Doppler signal increases (closing target), the output of the amplifier U4B will increase and rise above the 0.7 volt threshold of the diode DX so as to cause conduction thereof, supplying current to the transconductance amplifiers. The resistor R12 is a current-limiting resistor so as to prevent damage to the transconductance amplifiers by excessive currents. As the Doppler signal is further increased, there will be a corresponding increase in the control current and thus maintains the Doppler shift at a set level. The level at which the AGC circuit 33b compresses is controlled by resistors R24, R25 which is 1 V peak-to-peak for the values shown.

The output signal on line 162 from the AGC circuit 33b of the preamplifier section 32A is applied to the input of the conditioning circuit 32B. Referring to FIG. 14, the conditioning circuit consists of a first unity gain inverting op amp U5A (I.C. OP213) along with resistors R27, R28 and capacitor C14 so as to define a low-pass filter and a second unity gain inverting op amp U5B (I.C. OP213) along with resistors R29, R30. The low-pass filter serves to remove high frequencies from the output signal which prevents aliasing problems in the A/D conversion section 32C. This filtered output from the first unity gain amplifier on line 164 is fed to the input of the second unity gain amplifier U5B. The capacitor C15 removes any DC components from being applied to the amplifier U5A. Resistors R31, R32 and capacitor C13 provide an analog ground reference for the amplifiers U5A, U5B, respectively. The output (pin 1) on the line 164 of the first unity gain amplifier U5A and the output (pin 7) on line 166 represent low-pass filtered signals which are identical in magnitude, but are opposite in polarity.

This differential amplified signals on the lines 164 and 166 from the conditioning circuit 32B are applied to the input of the A/D converter circuit 39 of the A/D conversion section 32C. Referring to FIG. 15, the A/D converter 39 functions to essentially digitize the differential analog signals on the lines 164, 166 so as to transform the analog information into a digital representation. The A/D converter circuit 39 includes an A/D converter U1 which is an I.C. DSP56ADC16 manufactured by Motorola, Inc. The A/D converter U1 converts the differential analog signals to 16 bit signed digital words. One of the differential signals is applied via terminal AIN+ and a low-pass filter (R2, C7) to pin 2 of I.C. U1, and the other one of the differential signals is applied via terminal AIN– and a low-pass filter (R3, C8) to pin 3 thereof. The capacitor C12 provides a charge distribution path between the terminals AIN+ and AIN−. The capacitors C1, C2 serve to filter the analog power supply, and the capacitors C3, C4 serve to filter the digital power supply. The capacitor C6 provides filtering for the reference terminals of the I.C. U1.

Ferrite beads L1, L2 and L3, L4 are coupled to opposite ends of a capacitor C10 so as to prevent high frequency from being generated from the A/D conversion section 32C. A voltage regulator U3 is an I.C. LM2931 from National Semiconductor which provides a stable +5.0 volts for the analog and digital circuitry within the I.C. U1. A clock oscillator chip U4 is an I.C. SG531P from Epson Corporation which generates a 6 MHz clock signal for the A/D converter U1 in order to establish the sampling rate at 48 KHz and the bit transfer rate at 1.5 MHz. The resistor R4 is a current limiting resistor which limits the current from the oscillator chip U4 and thus reduces the EMI. The capacitor C11 decouples any noise from the power supply to ground. The A/D converter U1 generates digital signals CLK on pin 10, DATA on pin 11, and FRAME SYNC on pin 9 and sends them via a line driver U2 (I.C. DS34C87) to the antenna cable via a connector JP1.

In FIG. 16, there is shown a schematic circuit diagram of the power supply circuitry 24A (FIG. 1) for the Gunn oscillator 22 as well as for the power supply circuitry 24B for the preamplifier circuitry 32. The Gunn oscillator diode is coupled to the terminal P3. The power supply circuit 24A is formed of an adjustable voltage regulator U6 (I.C. LM2941 from National Semiconductor) and associated resistors R38, R39. These resistors effectively set the output (pin 5) of the regulator U6 to be +5.8 volts. The power supply circuit 24A also includes a Zener diode D2, resistors R36 and R37, and a transistor Q1. The DC voltage appearing on the terminal B+ is greater than +10.5 volts when the antenna is activated (transmitting), or +9 volts when it is in the standby condition. Since the Zener diode has a breakdown voltage of +9.1 volts, the regulator U6 will be enabled via pin 2 when the voltage at the terminal B+ is approximately +9.8 volts or greater. This causes the Zener diode to conduct current which turns on the transistor Q1, thereby pulling its collector (pin 2) to the ground potential and enabling the regulator U6. On the other hand, when the terminal B+ is less than +9.8 volts, the Zener diode D2 will be non-conductive and the transistor Q1 will be turned off. This will, in turn, keep the pin 2 high so as to disable the regulator U6, thereby turning off the Gunn oscillator 22.

The power supply circuit 24B consists of a low dropout voltage regulator U7, which is an I.C. chip TK11690 manufactured by Toko Corporation. The regulator U7 generates +9 volts on its output pin 1. The capacitors C18 and C19 are used to perform power supply filtering before and after the regulator, respectively.

From the foregoing detailed description, it can thus be seen that the present invention provides an improved transceiver module for use in a police traffic surveillance radar system which is of a smaller size in construction and weighs less than the prior art transceivers. As a result, the present transceiver module can overcome the space restrictions due to the passenger-side air bag requirements. The transceiver module is formed of a housing having a cavity, a transceiver assembly disposed within the cavity of the housing, and a radome fixedly secured over the open end of the housing so as to enclose and hermetically seal the transceiver assembly within the cavity of the housing.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A police traffic surveillance radar system, the improvement comprising a transceiver module comprising:

a front, open-ended housing having a cavity, the housing having a width dimension of approximately 2.3 inches, a height dimension of approximately 2.3 inches, and a depth dimension of approximately 1.7 inches;

a transceiver assembly disposed within said cavity of said housing, the transceiver assembly having an antenna card/plate subassembly a diode housing subassembly, an oscillator/choke housing subassembly, and a printed circuit board subassembly all operatively interconnected together, the transceiver assembly enabling a inirnum target range of 1,724 feet to detect and process velocity information;

said antenna card/plate subassembly formed of an antenna card and an antenna plate, said antenna card further comprising a patch antenna array, said patch antenna array formed of a plurality of square, side-fed patches arranged in a matrix pattern divided into four symmetrical quadrants, said patches each having a microstrip patch element;

said oscillator/choke housing subassembly having an oscillator block, said oscillator block having a front side and a rear side, said front side being formed with a Y-shaped circulator cavity defined by first, second, and third arms, said circulator cavity having a central portion for mounting a circulator pedestal and a Ferrite puck;

said printed circuit board subassembly is used to mount preamplifier circuitry and is formed of a top board and a bottom board, said top board having an analog/digital conversion section for converting the analog signals to digital signals, said bottom board having a preamplifier section for controlling gain of received analog signals, and a power supply section for generating power for a Gunn diode and said preamplifier circuitry; and a radome fixedly secured over the open end of said housing so as to enclose and hermetically seal said transceiver assembly within said cavity of said housing.

2. In a police traffic surveillance radar system as claimed in claim 1, wherein said housing is of a substantially rectangular-shaped cross-section and is formed of a lightweight metallic material.

3. In a police traffic surveillance radar system as claimed in claim 2, wherein said metallic material is aluminum which is treated to be black on its outer surface.

4. In a police traffic surveillance radar system as claimed in claim 3, wherein said radome includes a flat, rectangular front face and a rectangularly-shaped flange portion extending rearwardly from said front face.

5. In a police traffic surveillance radar system as claimed in claim 4, wherein said radome is formed of a suitable plastic material.

6. In a police traffic surveillance radar system as claimed in claim 1, wherein said transceiver module is formed of a substantially cubical construction having a width dimension of approximately 2.3 inches, a height dimension of approximately 2.3 inches, and a depth dimension of approximately 1.7 inches.

7. In a police traffic surveillance radar system as claimed in claim 1, wherein said diode housing subassembly includes a flat mounting base plate having a front surface and a back surface, said front surface having an annular recess in its center for receiving a magnet therein, said back surface having a first aperture for mounting a mixer diode and a second aperture for receiving a Gunn diode.

8. In a police traffic surveillance radar system as claimed in claim 1, wherein said first arm defines an oscillator cavity for communication with a Gunn diode and a Gunn choke, said second arm is in communication with an antenna feedthrough from said antenna card/plate subassembly, and said third arm is in communication with a mixer diode and a mixer choke.

9. In a police traffic surveillance radar system as claimed in claim 1, wherein said rear side of said oscillator block includes a plurality of recesses for mounting said Gunn choke, said mixer choke, a first set screw for adjusting the power of the Gunn oscillator, and a second set screw for controlling the mismatch with said antenna feedthrough.

10. A method of determining the velocity of target vehicles in a police traffic surveillance radar system, comprising the steps of:

providing a DC voltage current from a power supply to a Gunn Diode oscillator wherein the DC voltage current is converted into microwave energy at a frequency of 35.5 Ghz±100 MHz;

directing the microwave energy through a 3-Port Ferrite circulator defined by a first arm, a second arm, and a third arm to produce radio frequency energy;

routing the radio frequency energy from the first arm to the second arm of the 3-Port Ferrite circulator, the second arm being coupled to a microstrip patch antenna, the microstrip patch antenna having a patch antenna array, the patch antenna array formed of a plurality of square, side-fed patches arranged in a matrix pattern divided into four symmetrical quadrants, the patches each having a microstrip patch element;

radiating the radio frequency energy from the microstrip patch antenna to produce a transmitted frequency energy that is directed to a target to produce a reflected microwave energy from the target, the microstrip patch antenna enabling the transmitted frequency energy to reach targets located at a minimum distance of 1,724 feet;

changing the reflected microwave energy from right hand circular polarization to left hand circular polarization from a Doppler shift to produce a polarized energy;

receiving the polarized energy into the microstrip patch antenna;

directing the polarized energy from the microstrip patch antenna to the second arm of the 3-Port Ferrite circulator;

routing the polarized energy from the second arm of the 3-Port Ferrite circulator to the third arm of the 3-Port Ferrite circulator, the third arm being coupled to a mixer;

mixing the transmitted energy and the polarized energy through the mixer to produce a differential signal;

filtering residual microwave energy from the differential signal by passing the transmitted energy and the polarized energy through a mixer bias choke to produce a clean differential signal;

routing the clean differential signal to a preamplifier circuitry;

processing the clean differential signal in the preamplifier circuitry to produce a speed measurement of the target; and displaying the speed measurement on a display unit to be read by a user, the display unit in a housing, the housing having a width dimension of approximately 2.3 inches, a height dimension of approximately 2.3 inches, and a depth dimension of approximately 1.7 inches.

* * * * *